(12) United States Patent
Nakada et al.

(10) Patent No.: US 8,820,695 B2
(45) Date of Patent: Sep. 2, 2014

(54) SOFT COVER FOR TABLET PC

(75) Inventors: Kazuo Nakada, Kanagawa-Ken (JP);
Hiroki Hirano, Kanagawa-Ken (JP);
Shinya Oguchi, Kanagawa-Ken (JP)

(73) Assignee: Lenovo (Singapore) Pte. Ltd.,
Singapore (SG)

( * ) Notice: Subject to any disclaimer, the term of this patent is extended or adjusted under 35 U.S.C. 154(b) by 199 days.

(21) Appl. No.: 13/488,959

(22) Filed: Jun. 5, 2012

(65) Prior Publication Data
US 2013/0322003 A1 Dec. 5, 2013

(51) Int. Cl.
*H05K 5/00* (2006.01)
*H05K 7/00* (2006.01)
*G06F 1/16* (2006.01)

(52) U.S. Cl.
USPC ...... 248/454; 248/455; 248/456; 361/679.26; 335/219; 206/45.2

(58) Field of Classification Search
USPC ............... 361/679.26; 206/45.2; 335/219; 248/454, 455, 456
See application file for complete search history.

(56) References Cited

U.S. PATENT DOCUMENTS 8,264,310 B2 * 9/2012 Lauder et al. ............... 335/219
8,640,864 B2 * 2/2014 Chen et al. .................. 206/45.2

OTHER PUBLICATIONS http://www.engadget.com/2011/12/05/asus-transformer-prime-origami-style-smart-cover-is-ready-for-it/, Dec. 5, 2011, pp. 1-2.

* cited by examiner

*Primary Examiner* — Anthony Haughton
(74) *Attorney, Agent, or Firm* — Shimokaji & Assoc., P.C.

(57) ABSTRACT

A support for an object is provided. The support may comprise a bottom part, a sidewall, and a plurality of fasteners. The plurality of sidewalls may be connected to the bottom part. The bottom part and the plurality of sidewalls may be made of essentially one piece of flat member. The bottom part and the plurality of sidewalls form an easel to accept the object. The plurality of fastener may be disposed on the plurality of sidewalls.

20 Claims, 5 Drawing Sheets

SOFT COVER FOR TABLET PC

BACKGROUND OF THE INVENTION

The present invention relates generally to computer peripherals and, more specifically, to a soft cover which functions as an easel for a tablet personal computer.

In recent years, various personal computers have evolved from transportable suitcase style computers, to popular laptops or notebooks due to their affordable prices. Many features have been added to electronic devices, such as portable telephones and personal computers to attract more users More recently, the tablet type personal computer (PC) is growing rapidly due to its affordability and portability. Peripherals for tablet PCs have a growing market, especially tablet covers. However, some of the tablet covers on the market are soft and not sturdy enough to support the tablet PC.

Therefore, it can be seen that there is a need for a soft cover for a tablet PC to be used as a sturdy support.

SUMMARY

In one aspect, a support comprises a bottom part; a sidewall connected to the bottom part, wherein the bottom part and the sidewall are made of one piece of flat member, wherein the bottom part and the sidewall form an easel to accept an object; and a plurality of fastener disposed on the sidewall.

In another aspect, a support for an electronic apparatus comprises a flat member having a plurality of ridge folding lines, wherein the plurality of ridge folding lines divide the flat member into a plurality of parts, wherein the plurality of parts are foldable along the plurality of ridge folding lines into an easel to support the electronic apparatus; and a plurality of fasteners disposed on the plurality of parts.

In a further aspect, an electronic apparatus comprises an upper housing having a processor and a screen, wherein the screen is coupled to be operable by the processor to display data to a user of the electronic apparatus; and a cover pivotally coupled to the upper housing for movement between a first configuration and a second configuration, wherein the cover is adapted to support the display housing, wherein the cover has a plurality of fasteners at corners of the cover.

These and other features, aspects and advantages of the present invention will become better understood with reference to the following drawings, description and claims.

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments provide an easel for supporting an object. More specifically, exemplary embodiments provide a soft cover which may be used as a tablet PC stand. According to exemplary embodiments, the cover has two folding patterns and may be able to be used as a support for a tablet PC in two angles, for example, with an angle for a user to watch a DVD or movie or with another angle for a user to touch input. Some folding lines may be common in two patterns, but some folding lines may be exclusive for each pattern. In exemplary embodiments, a plurality of magnets may be used as snaps near corners of the soft cover. The magnets may keep the soft cover in folded shape and make a sturdy supporting structure.

Figure 1:
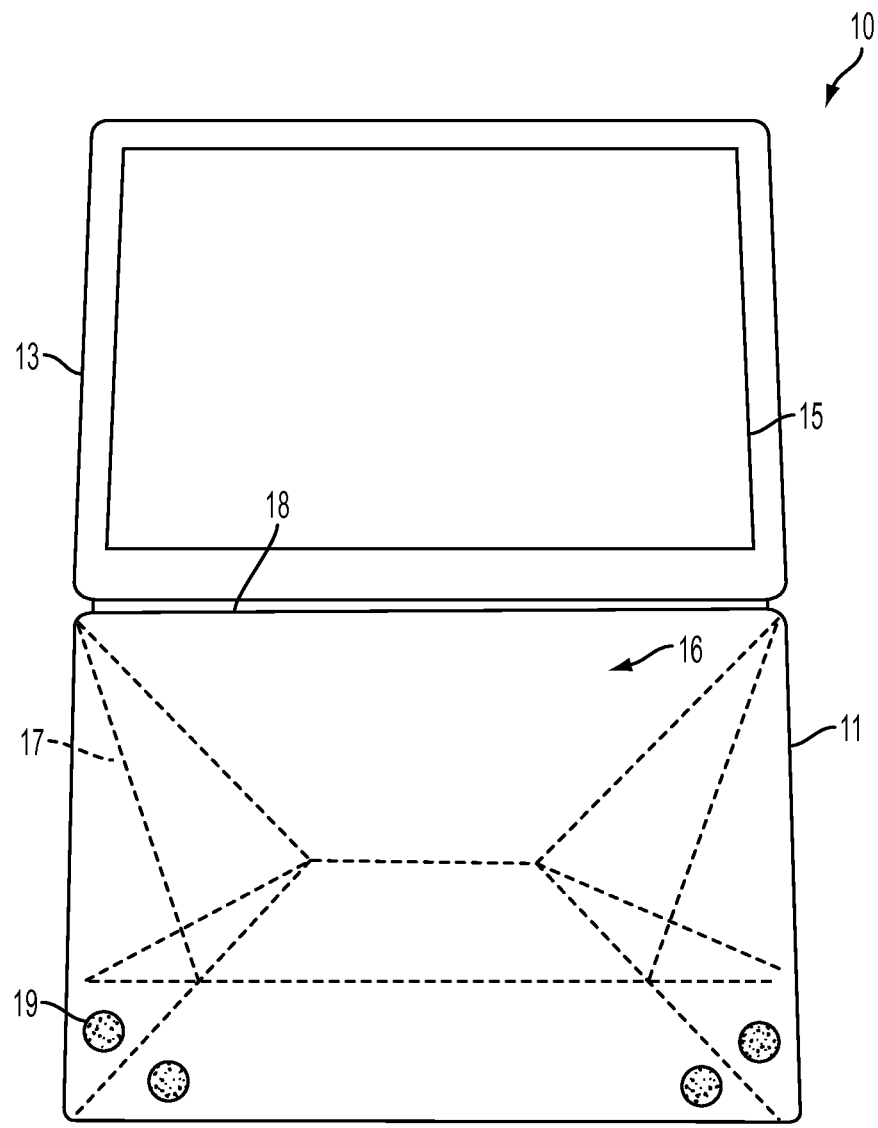
FIG. 1 is a top view of a tablet PC with a cover according to an exemplary embodiment.

FIG. 1 is a top view of an exemplary embodiment of a computing system which is capable of receiving, processing, and outputting data, such as a tablet PC 10. The tablet PC 10 may be a laptop computer system, such as one of the ThinkPad® series of personal computers sold by Lenovo (US) Inc. of Morrisville, N.C., or a workstation computer, such as the ThinkStation®, which is sold by Lenovo (US) Inc. of Morrisville, N.C.

The tablet PC 10 may have a screen 15, such as a liquid crystal display (LCD), for example, in an upper housing 13. The upper housing may have a processor (not shown). The screen 15 may be coupled to be operable by a processor to display data to a user of the device. The screen 15 may be a touch sensitive screen. A user may use an object, such as a stylus, or a finger, for example, to input data on the screen.

A cover 11, which may be a flat member, for example, may have a plurality of folding lines 17 and a plurality of first fasteners 19. The first fasteners 19 may include a magnet, or a hook and loop fastener, such as Velcro®, for example. The plurality of folding lines 17 may divide the cover 11 into a plurality of parts 16. The cover 11 and the upper housing 13 may be openably coupled to each other pivoting on a fastener 18. The cover 11 may be made of semi-hard materials, which may be folded or unfolded easily.

Figure 2A:
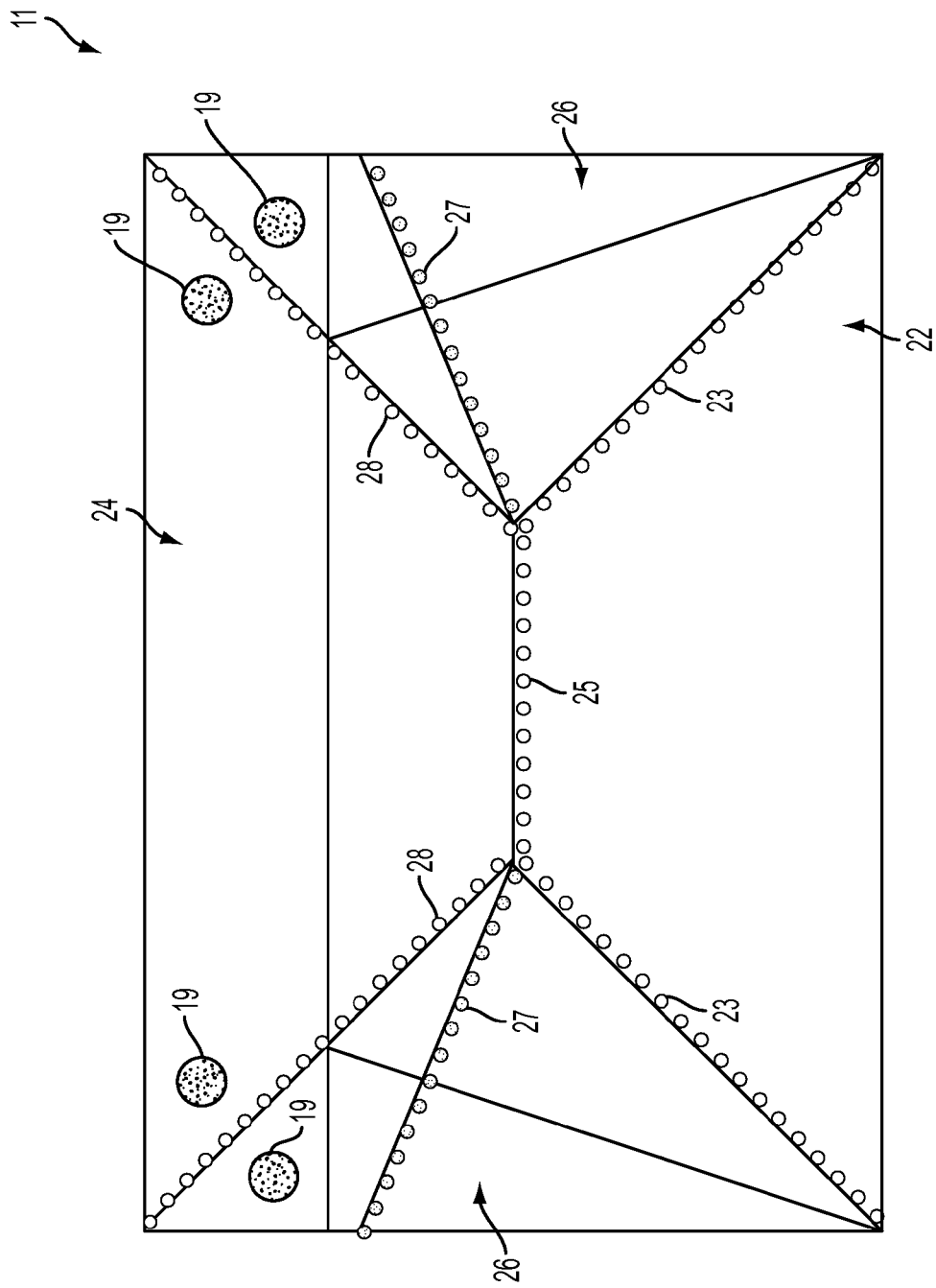
FIG. 2A is a plan view of a cover illustrating a folding pattern according to an exemplary embodiment.

Referring to FIG. 2A, an exemplary embodiment of the cover 11 of the tablet PC 10 may further include a bottom part 22, side walls 24 and 26. The sidewalls 24 and 26 may be connected to the bottom part 22 to form an easel to accept an object. The sidewalls 24 and 26 may form two configurations with the bottom part at two different angles to accept an object. The folding lines 17 may further include ridge folding lines and valley folding lines 27. The ridge folding lines may define a ridge when the cover 11 is folded along the ridge folding line. The valley folding lines may define a valley when the cover is folded along the valley folding line 27. The ridge folding lines may include a first ridge folding line 28, a second ridge folding line 23, and a third ridge folding line 25. In one exemplary embodiment, the first fastener 19 may be distributed on corners of the side walls 24 and 26 on both sides of the first ridge folding line 28. In another exemplary embodiment, the fastener may be disposed on a position other than on corners of the side walls 24, 26 or the bottom 22.

In operation, the side walls 24 and 26 may be lifted up toward the bottom part 22. A part of the side walls 24 and 26 may be folded along the first ridge folding lines 28 in such a way that the first ridge folding lines 28 may be substantially above a plane where the bottom part 22 of the cover 11 stays. The side walls 26 and the bottom part 22 may be folded along the second ridge folding lines 23. The side wall 24 may be folded along the third ridge folding line 25. The side walls 26 may be folded along the valley folding lines 27. The fastener 19 may snap with another fastener which may be symmetrically located across the first ridge folding line 28. The fastener 19 after snapping may make the cover 11 as a support more rigid.

Figure 2B:
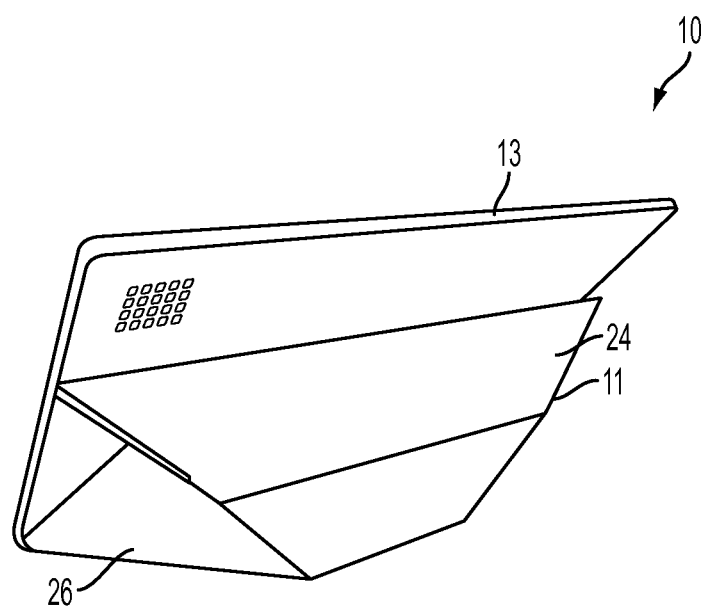
FIG. 2B is a perspective view of a table PC with the cover used as a support according to an exemplary embodiment.

FIG. 2B shows an exemplary embodiment of a watching configuration of the tablet PC 10. Users may watch a movie or DVD on the tablet PC in a first configuration, such as a watching configuration, for example. The cover 11 may be flipped over to the opposite side of screen of the upper housing 13 and used as a support when the side walls 26 and 24 are folded as mentioned above. A part of the side walls 24 and 26 may be overlapped together.

Figure 3A:
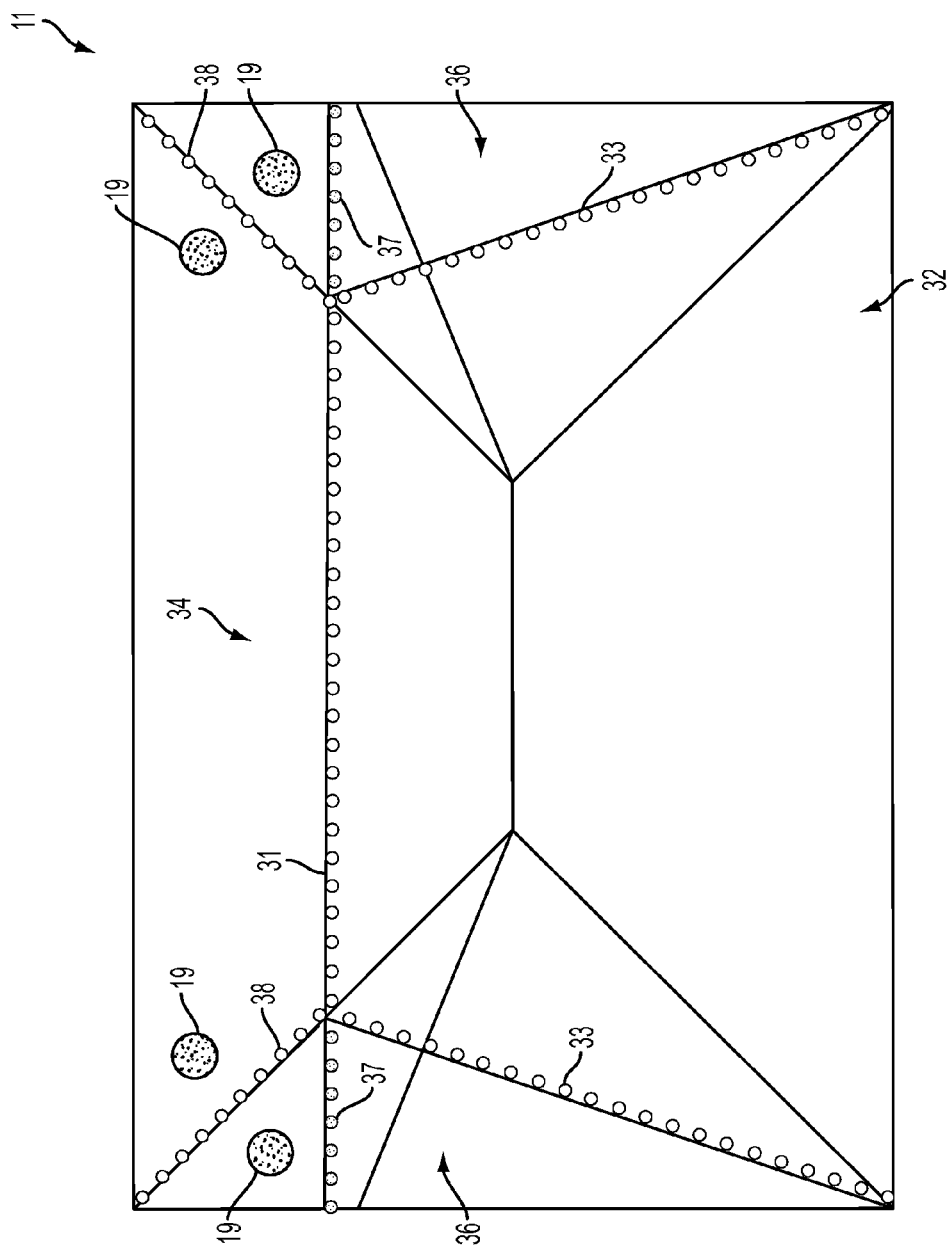
FIG. 3A is a plan view of a cover illustrating a folding pattern according to another exemplary embodiment.

Referring to FIG. 3A, an exemplary embodiment of the cover 11 of the table PC 10 may further include a first ridge folding line 38, a second ridge folding line 33, and a third ridge folding line 31. The first ridge folding lines 38, the second ridge folding line 33, and the third ridge folding line 31 may divide the cover 11 into a bottom part 32 with side walls 36, 34. The sidewalls 36 may further include valley lines 37. The first ridge folding line 38 may share a part of common line as the ridge line 28 shown in FIG. 2A.

In operation, the side walls 34 and 36 may be lifted up toward the bottom part 32. A part of the side walls 34 and 36 may be folded along the first ridge folding lines 38 in such a way that the first ridge folding line 38 may be substantially above a plane where the bottom 32 of the cover 11 stays. The side walls 36 and the bottom part 32 may be folded along the second ridge folding lines 33. The side wall 34 may be folded along the ridge line 31. The side wall 36 may be folded along the valley lines 37.

Figure 3B:
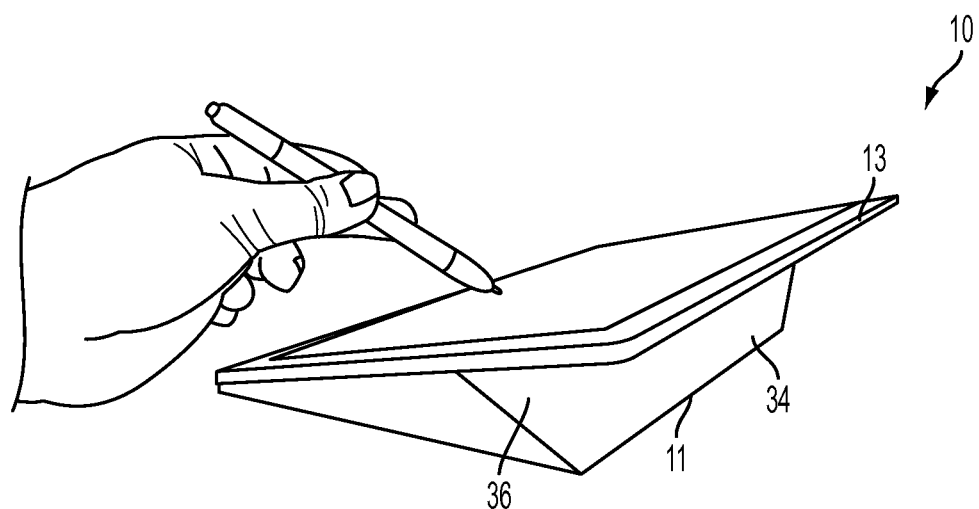
FIG. 3B is a perspective view of a table PC with the cover used as a support according to another exemplary embodiment.

FIG. 3B shows an exemplary embodiment of a second configuration, such as an input configuration, for example, of the tablet PC 10. Users may input data on the tablet PC by using a stylus. The cover 11 may be used as a support when the side walls 36 and 34 are folded as mentioned above. A part of the side walls 34 and 36 may be overlapped together. In the input configuration, an angle between the bottom part 32 and the upper housing 13 is smaller than that in the watching configuration.

The watching configuration and the input configuration may be interchanged easily. Users may push in along two different valley folding lines and lift up or down the side walls to switch between the watching configuration and the input configuration.

It should be understood, of course, that the foregoing relate to exemplary embodiments of the invention and that modifications may be made without departing from the spirit and scope of the invention as set forth in the following claims.

We claim:

1. A support, comprising:
   a trapezoidal bottom part including a short parallel side, a long parallel side, and two non-parallel sides;
   a trapezoidal top sidewall including a short parallel side, a long parallel side, and two non-parallel sides, the short parallel side of the top sidewall flexibly connected to the short parallel side of the bottom part to form a third ridge folding line and
   two triangular sidewalls, each triangular sidewall including an outer side, a first connecting side, and a second connecting side, each first connecting side flexibly connected to a non-parallel side of the top sidewall to form a first ridge folding line, each second connecting side flexibly connected to non-parallel side of the bottom part to form a second ridge folding line, each triangular sidewall including valley folding lines extending from the intersection of the first connecting side and the second connecting side to a point on the outer side; and
   wherein the bottom part, the top sidewall, and the two triangular sidewalls are made of one piece of flat member,
   wherein the bottom part, the top sidewall, and the two triangular sidewalls form an easel to accept an object; and
   wherein a plurality of first fasteners are disposed on the top sidewall and the two triangular sidewalls.

2. The support of claim 1, wherein the plurality of first fasteners are magnets.

3. The support of claim 1, wherein
   the top sidewall and two triangular sidewalls form a first configuration and a second configuration, and
   the short parallel side of the top sidewall flexibly connects to the short parallel side of the bottom part at a first angle in the first configuration and at a second angle in the second configuration to accept the object, and
   the first angle is greater than the second angle.

4. The support of claim 1, further comprising a second fastener on the bottom wherein the second fastener is adapted to connect to the object.

5. The support of claim 4, wherein the second fastener is pivotally coupled to the object.

6. The support of claim 1, wherein the plurality of first fasteners include fasteners disposed at each corner of the top sidewall formed by a non-parallel side and the long parallel side, and the corner of each triangular side formed by the first connecting side and the outer side.

7. The support of claim 1, wherein;
   the top sidewall and two triangular sidewalls form a first configuration and a second configuration to accept the object,
   the bottom part has a first bottom height in the first configuration and a second bottom height in the second configuration, and
   the first bottom height is less than the second bottom height.

8. The support of claim 1, wherein;
   the top sidewall and two triangular sidewalls form a first configuration and a second configuration to accept the object,
   the top sidewall has a first top sidewall height in the first configuration and a second top sidewall height in the second configuration, and
   the first top sidewall height is greater than the second top sidewall height.

9. The support of claim 1, wherein the bottom part forms an isosceles trapezoidal shape.

10. A support for an electronic apparatus, comprising:
    a flat member having a plurality of ridge folding lines, wherein the plurality of ridge folding lines divide the flat member into a plurality of parts, wherein the plurality of parts are foldable along the plurality of ridge folding lines into an easel to support the electronic apparatus; and
    a plurality of first fasteners disposed on the plurality of parts, and
    wherein the plurality of parts includes a trapezoidal bottom part including a short parallel side, a long parallel side, and two non-parallel sides, a trapezoidal top sidewall including a short parallel side, a long parallel side, and two non-parallel sides, and two triangular sidewalls, each triangular sidewall including an outer side, a first connecting side, and a second connecting side, wherein the plurality of ridge folding lines includes two first ridge folding lines, each first ridge folding line located at a connection of a non-parallel side of the top sidewall and a first connecting side of one of the two triangular sidewalls, wherein the plurality of ridge folding lines includes two second ridge folding lines, each second ridge folding line located at a connection of a non-parallel side of the bottom part and a second connecting side of the two triangular sidewalls, and wherein the plurality of ridge folding lines includes a third ridge folding line located at a connection of the short parallel side of the bottom part and the short parallel side of the top sidewall.

11. The support for an electronic apparatus of claim 10, wherein the flat member has a plurality of valley folding lines, wherein the plurality of valley folding lines define a valley when the flat member is folded.

12. The support for an electronic apparatus of claim 10, wherein the plurality of fasteners include fasteners disposed on corners of the top sidewall formed by the long parallel side and one of the non-parallel sides.

13. The support for an electronic apparatus of claim 10, further comprising a second fastener wherein the second fastener is pivotally coupled to the electronic apparatus.

14. The support for an electronic apparatus of claim 10, wherein the plurality of first fasteners are magnets.

15. The support for an electronic apparatus of claim 9, wherein the plurality of fasteners include fasteners disposed on corners of the two triangular sidewalls formed by the first connecting side and the outer side.

16. The support of claim 10, wherein the top sidewall forms an isosceles trapezoidal shape.

17. An electronic apparatus, comprising:
an upper housing having a processor and a screen, wherein the screen is coupled to be operable by the processor to display data to a user of the electronic apparatus; and
a cover pivotally coupled to the upper housing, the cover including a flat member having a plurality of ridge folding lines, the plurality of ridge folding lines dividing the flat member into a plurality of parts, the flat member foldable along the plurality of ridge folding lines to form a first configuration or a second configuration to support the upper housing, wherein the plurality of parts includes a trapezoidal bottom part including a short parallel side, a long parallel side, and two non-parallel sides, a trapezoidal top sidewall including a short parallel side, a long parallel side, and two non-parallel sides, and two triangular sidewalls, each triangular sidewall including an outer side, a first connecting side, and a second connecting side, wherein the plurality of ridge folding lines includes two first ridge folding lines, each first ridge folding line located at a connection of a non-parallel side of the top sidewall and a first connecting side of one of the two triangular sidewalls, wherein the plurality of ridge folding lines includes two second ridge folding lines, each second ridge folding line located at a connection of a non-parallel side of the bottom part and a second connecting side of the two triangular sidewalls, and wherein the plurality of ridge folding lines includes a third ridge folding line located at a connection of the short parallel side of the bottom part and the short parallel side of the top sidewall and wherein the cover has a plurality of first fasteners at corners of the cover.

18. The electronic apparatus of claim 17, wherein the cover further comprises valley folding lines, wherein the plurality of valley folding lines define one or more valleys and the plurality of ridge folding lines define one or more ridges in the first configuration or the second configuration.

19. The electronic apparatus of claim 17, wherein the cover is configured to form an easel to accept the upper housing in the first configuration or the second configuration.

20. The electronic apparatus of claim 17, wherein the plurality of first fasteners are magnets.

\* \* \* \* \*